(12) United States Patent
Niu et al.

(10) Patent No.: US 11,823,805 B2
(45) Date of Patent: Nov. 21, 2023

(54) ACOUSTO-OPTIC LEAKAGE MONITORING SYSTEM FOR NUCLEAR POWER PLANT MAIN STEAM PIPELINE

(71) Applicant: Shanghai Nuclear Engineering Research & Design Institute Co., LTD., Shanghai (CN)

(72) Inventors: Tingting Niu, Shanghai (CN); Hao Jiang, Shanghai (CN); Jinquan Yan, Shanghai (CN); Chunli Liu, Shanghai (CN); Wei Shi, Shanghai (CN); Shuan Xia, Shanghai (CN); Youqiang Cai, Shanghai (CN); Minming Zhan, Shanghai (CN); Fei Li, Shanghai (CN); Mingxu Zhang, Shanghai (CN)

(73) Assignee: Shanghai Nuclear Engineering Research & Design Institute Co., LTD., Shanghai (CN)

( * ) Notice: Subject to any disclaimer, the term of this patent is extended or adjusted under 35 U.S.C. 154(b) by 375 days.

(21) Appl. No.: 17/273,055

(22) PCT Filed: Sep. 11, 2019

(86) PCT No.: PCT/CN2019/105366
§ 371 (c)(1),
(2) Date: Mar. 3, 2021

(87) PCT Pub. No.: WO2020/052589
PCT Pub. Date: Mar. 19, 2020

(65) Prior Publication Data
US 2021/0343434 A1    Nov. 4, 2021

(30) Foreign Application Priority Data
Sep. 12, 2018 (CN) .......................... 201811062972.8

(51) Int. Cl.
*G21C 17/00* (2006.01)
*G21C 17/017* (2006.01)
(Continued)

(52) U.S. Cl.
CPC .......... *G21C 17/002* (2013.01); *F17D 5/005* (2013.01); *F17D 5/06* (2013.01); *G21C 17/017* (2013.01)

(58) Field of Classification Search
CPC .. G21C 17/002; G21C 17/017; G21C 17/022; G21C 17/032; F17D 5/02; F17D 5/06
See application file for complete search history.

(56) References Cited

U.S. PATENT DOCUMENTS 3,849,655 A * 11/1974 Martucci ............... G01M 3/228
376/250
3,921,440 A * 11/1975 Toth ..................... G01N 29/265
73/622

(Continued)

FOREIGN PATENT DOCUMENTS

CN       202598147 U    12/2012
CN       103836348 A     6/2014
(Continued)

OTHER PUBLICATIONS

Turkish Office Action in counterpart Turkish Application No. 2020/22551 dated Jun. 29, 2022 with Machine Translation.

(Continued)

*Primary Examiner* — Sharon M Davis
(74) *Attorney, Agent, or Firm* — Renner, Otto, Boisselle & Sklar, LLP

(57) ABSTRACT

An acousto-optic leakage monitoring system for main steam pipeline in nuclear power plant. The system includes an acoustic emission leakage monitoring loop and a spectrum leakage monitoring loop, wherein the signal input ends of
(Continued)

the acoustic emission leakage monitoring loop and the signal input ends of the spectrum leakage monitoring loop are respectively arranged at detection points of the main steam pipeline. The signal output ends of the acoustic emission leakage monitoring loop and the signal output ends of the spectrum leakage monitoring loop are communicatively connected to each other through a network switch, and the network switch is sequentially connected with a control unit and a display unit. Compared with the prior art, the acousto-optic leakage monitoring system for the main steam pipeline in nuclear power plant according to the present invention provides early warning before the main steam pipeline leaks and realizes the diversity and redundancy of the main steam pipeline leakage monitoring methods by combining acoustic emission and spectroscopy, so that the detection results are more credible, and the maintenance cost after installation is extremely low. The detection sensitivity is higher and the response time is shortened, which significantly improves the response speed after leakage is found and provides a larger safety margin.

7 Claims, 2 Drawing Sheets

(51) Int. Cl.
*F17D 5/00* (2006.01)
*F17D 5/06* (2006.01)

(56) References Cited

U.S. PATENT DOCUMENTS

| | | | | | |
|---|---|---|---|---|---|
| 4,117,733 | A | * | 10/1978 | Gugel | G21C 17/01 376/249 |
| 4,543,817 | A | * | 10/1985 | Sugiyama | F17D 5/06 73/40.5 A |
| 8,855,259 | B2 | * | 10/2014 | Yeon | G21C 17/002 376/250 |
| 2010/0118294 | A1 | * | 5/2010 | Han | G01M 3/222 73/40 |
| 2016/0252481 | A1 | * | 9/2016 | Zheng | G01M 3/40 324/238 |
| 2016/0315705 | A1 | * | 10/2016 | Langguth | H04B 10/25891 |

FOREIGN PATENT DOCUMENTS

| | | | |
|---|---|---|---|
| CN | 103968257 | A | 8/2014 |
| CN | 104977298 | A | 10/2015 |
| CN | 106287238 | A | 1/2017 |
| CN | 108506732 | A | 9/2018 |
| CN | 109087720 | A | 12/2018 |
| DE | 0140174 | A1 * | 5/1985 ............. G21C 17/00 |

OTHER PUBLICATIONS

Extended European Search Report in counterpart European Application No. 19859751.0 dated May 12, 2022.

International Search Report for the corresponding application No. PCT/CN2019/105366, dated Dec. 9, 2019 with an English translation.

* cited by examiner

ACOUSTO-OPTIC LEAKAGE MONITORING SYSTEM FOR NUCLEAR POWER PLANT MAIN STEAM PIPELINE

CROSS-REFERENCE TO RELATED APPLICATIONS

This application is a national phase of International Application No. PCT/CN2019/105366 filed Sep. 11, 2019, which claims priority of Chinese Patent Application No. 201811062972.8 filed on Sep. 12, 2018, which are hereby incorporated herein by reference.

TECHNICAL FIELD

The present invention relates to the field of pipeline leakage monitoring.

BACKGROUND

The application of LBB (Leak Before Break) criterion for main steam pipeline in nuclear power plant design requires the nuclear power plant to have higher capability of monitoring pipeline leakage. By using a leakage monitoring system, the leakage of the pipeline can be found in time and effectively, and there is enough time to take corresponding handling measures so as to prevent pipeline cracks from growing to be large crevasses. The leakage monitoring system for the main steam pipeline should have positioning and quantification ability.

At present, the main steam pipeline leakage monitoring technology widely used in nuclear power plant design, such as liquid level measurement in containment pit, needs a long response time and has low positioning and quantitative accuracy. Therefore, it is necessary to develop a leakage monitoring system for the main steam pipeline using LBB technology to meet the requirements of LBB and realize the diversity of monitoring methods.

Therefore, there is a special need for an acousto-optic leakage monitoring system for the main steam pipeline in nuclear power plant to solve the above existing problems.

SUMMARY OF THE INVENTION

The object of the present invention is to provide an acousto-optic leakage monitoring system for the main steam pipeline in nuclear power plant, which aims at the deficiencies of the prior art, monitors the stress change of the main steam pipeline in real time, and accurately and quickly finds out the leakage point and determines the leakage amount after the pipeline leaks, thereby ensuring the safe operation of the nuclear power plant.

The technical problem to be solved by the present invention can be realized by adopting the following technical solution:

The present invention relates to an acousto-optic leakage monitoring system for main steam pipeline in nuclear power plant, which comprises an acoustic emission leakage monitoring loop and a spectrum leakage monitoring loop, wherein the signal input ends of the acoustic emission leakage monitoring loop and the signal input ends of the spectrum leakage monitoring loop are respectively arranged at a plurality of detection points of the main steam pipeline; the signal output ends of the acoustic emission leakage monitoring loop and the signal output ends of the spectrum leakage monitoring loop are in communication connection with each other through a network switch, and the network switch is sequentially connected with a control unit and a display unit.

In an embodiment of the present invention, a plurality of detection points are respectively arranged around the weld seams of the main steam pipeline, and the acoustic emission leakage monitoring loop comprises a plurality of acoustic emission sensors arranged around the weld seams of the main steam pipeline, signal amplifiers and a data acquisition unit, wherein the acoustic emission sensors are in communication connection with the data acquisition unit through the signal amplifiers.

Preferably, the acoustic emission sensors, the signal amplifiers and the data acquisition unit are in communication connection with each other through armored optical fiber cables.

Preferably, the data acquisition unit comprises a crate, an acquisition card and an I/O card, wherein the acquisition card collects signals transmitted by the signal amplifiers and converts the signals into digital signals, and the I/O card transmits the digital signals to the network switch.

In an embodiment of the present invention, a plurality of detection points are respectively arranged around the weld seams of the main steam pipeline, and the spectrum leakage monitoring loop comprises a plurality of micro-optical fiber probes arranged around the weld seams of the main steam pipeline, a laser transmitter and a spectrum analyzer, wherein the micro-optical fiber probes are in communication connection with the spectrum analyzer through the laser transmitters.

Preferably, the micro-optical fiber probes, the laser transmitter and the spectrum analyzer are in communication connection with each other through armored optical fiber cables.

Preferably, the micro-optical fiber probes are arranged in the containment, and each one has optical fiber interfaces at both ends, a hollow air chamber in the middle, wherein ambient air can freely pass through the hollow air chamber, and collimating lenses are arranged at both ends of the hollow air chamber.

Preferably, the laser transmitter comprises a near-infrared diode laser, which performs high-frequency narrow-band laser scanning around the characteristic absorption peak wavelength of water molecules.

Preferably, the spectrum analyzer comprises an analysis module and a signal output port; the spectrum analyzer is arranged outside the containment and connected with the micro-optical fiber probe inside the containment through armored optical fiber cable.

Compared with the prior art, the acousto-optic leakage monitoring system for the main steam pipeline in nuclear power plant according to the present invention realizes the diversity and redundancy of the main steam pipeline leakage monitoring methods by combining acoustic emission and spectroscopy, so that the detection results are more credible, the leakage of steam in gaseous state can be directly monitored at multiple measuring points under the containment environment, and the maintenance cost after installation is extremely low. The detection sensitivity is higher and the response time is shortened, which significantly improves the response speed after leakage is found and provides a larger safety margin. The structural damage of the main steam pipeline is detected during the stage of the pipeline cracks propagation, and an early warning can be provided before the leakage of the main steam pipeline, thereby realizing the object of the invention.

The characterizations of the present invention can be clearly understood by referring to the drawings and the following detailed description of preferred embodiments.

BRIEF DESCRIPTION TO THE DRAWING

MODE OF CARRYING OUT THE INVENTION

In order to make the technical means, creative features, goals and effects of the present invention easy to be understood, the present invention will be further explained with specific illustrations as shown in Figures.

The main steam pipeline in nuclear power plant is formed by welding multiple pipelines, which has the characteristics of high thermal parameters, many weld seams and bearing complex stress, and has high requirements on safety. According to the acousto-optic leakage monitoring system for the main steam pipeline in the nuclear power plant, the input ends of the system are arranged on the main steam pipeline in nuclear power plant, and the output ends are connected with a network switch to output signal data. The signal data is recorded, processed and analyzed through a control system, and an alarm is provided when leakage or the danger of leakage is detected.

Figure 1:
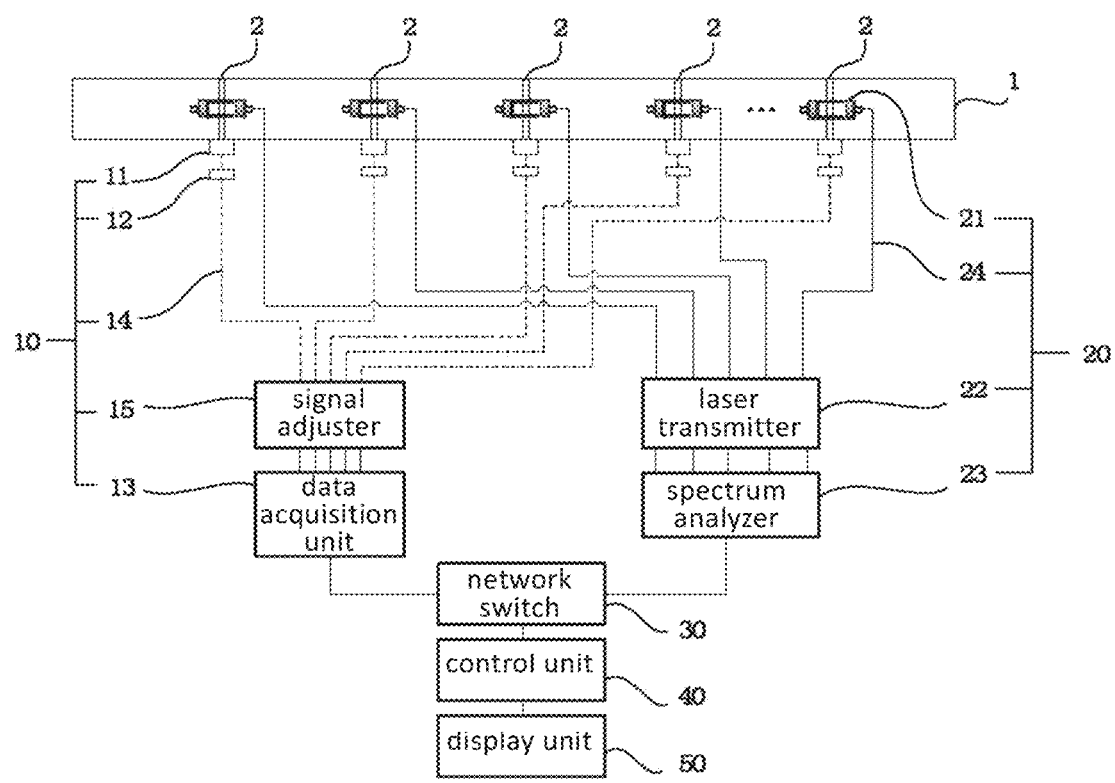
FIG. 1 is a functional block diagram of the acousto-optic leakage monitoring system for main steam pipeline in nuclear power plant according to an embodiment of the present invention.

FIG. 1 is a functional block diagram of the acousto-optic leakage monitoring system for main steam pipeline in nuclear power plant according to an embodiment of the present invention.

As shown in FIG. 1, the acousto-optic leakage monitoring system for the main steam pipeline in nuclear power plant in this embodiment includes an acoustic emission leakage monitoring loop 10 and a spectrum leakage monitoring loop 20. The main steam pipeline 1 is provided with a plurality of detection points 2. Because stress concentration is likely to occur at the weld seams of the pipeline which have high requirements on welding quality and reinforcement of joint pipes, pipeline leakage usually occurs at the weld seams of pipeline. Therefore the detection points 2 are preferably arranged around each weld seam of the main steam pipeline 1.

The signal input ends of the acoustic emission leakage monitoring loop 10 and the signal input ends of the spectrum leakage monitoring loop 20 are respectively arranged at a plurality of detection points 2 of the main steam pipeline 1, and the signal output ends of the acoustic emission leakage monitoring loop 10 and the signal output ends of the spectrum leakage monitoring loop 20 are in communication connection with each other through a network switch 30 which is sequentially connected with a control unit 40 and a display unit 50.

The acoustic emission leakage monitoring loop 10 can monitor stress change of the pipeline at the initial stage of pipeline structure change through acoustic emission, and collect the ultrasonic signal reflected by the pipeline to realize stress monitoring. The spectrum leakage monitoring loop 20 can detect the steam leakage of the main steam pipeline by laser scanning and processing the spectrum signal. The acoustic emission leakage monitoring loop 10 and the spectrum leakage monitoring loop 20 transmit the collected signal data to the network switch 30, and the network switch 30 transmits the received signal data to the control unit 40. The control unit 40 processes, analyzes and records the signal data, and the display unit 50 displays the processed data.

When the data processed by the control unit 40 shows that the signal data collected by one or more of the detection points 2 is abnormal, that is, out of the normal range, it means that the main steam pipeline may leak or be in danger of leaking at detection point and the display unit 50 provides an audible and visual alarm to indicate the leakage danger and display the specific location and number of the detection point with abnormal data. In this case, after receiving the alarm, the operator can take immediate actions to accurately find out the location of the detection point 2 with abnormal data displayed by the display unit 50.

In the acousto-optic leakage monitoring system for the main steam pipeline in nuclear power plant of this embodiment, the acoustic emission leakage monitoring loop 10 monitors stress change of the main steam pipeline in real time, and the spectrum leakage monitoring loop 20 accurately and quickly finds out the leakage point and determines the leakage amount after the pipeline leaks, thereby ensuring the safe operation of the nuclear power plant.

Further, in this embodiment, the acoustic emission leakage monitoring loop 10 includes a plurality of acoustic emission sensors 11 arranged around each weld seam of the main steam pipeline 1 in the insulation layer, signal amplifiers 12 and a data acquisition unit 13, and the acoustic emission sensors 11 are in communication connection with the data acquisition unit 13 through the signal amplifiers 12.

The acoustic emission sensors 11, the signal amplifiers 12 and the data acquisition unit 13 are preferably in communication connection with each other through an armored optical fiber cable 14. The acoustic emission sensors 11 send the collected acoustic signals to the data acquisition unit 13 through the armored optical fiber cables 14 and the signal amplifiers 12.

Armored optical fiber cables 14 are optical fiber cables with sheath formed of high temperature-resistant stainless steel, which can be used for a long time at 400° C. and meet the requirements of working environment in containment.

The acoustic emission sensors 11 are made of piezoelectric ceramic material, which can withstand the environmental radiation dose during the life of the nuclear power plant. The acoustic emission sensor 11 has a working frequency range of 50 kHz-300 kHz, a sensitivity greater than −70 dB, and can work for a long time in a high temperature environment below 400° C.

Each of the signal amplifiers 12 is located between the acoustic emission sensors 11 and the data acquisition unit 13, and is used for amplifying the signal detected by the acoustic emission sensor 11 and transmitting it to the data acquisition unit 13.

As shown in FIG. 1, a signal adjuster 15 may also be provided between a signal amplifier 12 and the data acquisition unit 13. The signal data is amplified by the signal amplifier 12 and then transmitted to the signal adjuster 15. The signal adjuster 15 performs nonlinear compensative level conversion on the received signal, which meets the requirements of remote data acquisition.

The data acquisition unit comprises a crate, an acquisition card and an I/O card, wherein the acquisition card collects signals transmitted by the signal amplifier 12 and converts the signals into digital signals, and the I/O card transmits the digital signals to the network switch 30. According to the area of the detection point, the data acquisition unit 13 uses an independent acquisition card to complete signal acquisition, which improves the safety of system operation.

In the acoustic emission leakage monitoring loop 10 of this embodiment, the acoustic emission sensors 11 are arranged around the weld seam of the main steam pipeline 1 in the thermal insulation layer. The acoustic emission sensors 11 can detect ultrasonic signals with specific frequencies in the process of cracking, crack propagation and pipeline rupture of the main steam pipeline. The signals are amplified by the amplifiers 12 and sent to the data acquisition unit 13 through the signal lines. After the data acquisition unit 13 receives the signal data, the network switch 30 transmits the received signal data to the control unit 40 which processes, analyzes and records the signal data, and the display unit 50 displays the processed data, thus realizing the detection of the leakage position and amount of the main steam pipeline.

Further, in this embodiment, the spectrum leakage monitoring loop 20 includes a plurality of micro-fiber probes 21 arranged around weld seams of the main steam pipeline in the insulation layer, a laser transmitter 22 and a spectrum analyzer 23, and the micro-fiber probes 21 are in communication connection with the spectrum analyzer 23 through the laser transmitter 22.

The micro-optical fiber probes 21, the laser transmitter 22 and the spectrum analyzer 23 are in communication connection with each other through an armored optical fiber cables 24. Armored optical fiber cables 24 are optical fiber cables with a sheath formed of high temperature-resistant stainless steel, which can be used for a long time at 400° C. and meet the requirements of working environment in containment.

The micro-optical fiber probes 21 are used for detecting leakage of steam, and have optical fiber interfaces at both ends, a hollow air chamber in the middle, wherein ambient air can freely pass through the hollow air chamber, and collimating lenses are arranged at both ends of the hollow air chamber. The main material of the micro-optical fiber probes 21 are 316SS, and the lenses are made of quartz, both of which can work for a long time in a high temperature environment below 400° C. and meet the working requirements in the containment of nuclear power plants.

The laser transmitter 22 emit laser with a specific wavelength by using a near-infrared diode laser as a light source. By changing the temperature and injected current, the laser transmitter 22 can realize high-frequency and narrow-band laser scanning around 1575 nm. At this wavelength, the detection sensitivity of $H_2O$ can reach 1 ppm per meter of optical path, the optical path of the micro-probe is about 20 mm, and its detection sensitivity is about 50 ppm, that is, the volume percentage is 0.05%, and the upper detection limit is 50%.

The spectrum analyzer 23 is used for receiving and processing spectrum signals, and comprises an analysis module and a signal output port. The spectrum analyzer 23 is outside the containment, and is connected with the micro-optical fiber probe 21 in the containment through the armored optical fiber cables 24.

The spectrum analyzer 23 is used to lock the absorption peak of gaseous water by using a reference cell, and qualitatively and quantitatively analyze the absorption peak signal of gaseous water, and has no system drift and needs no calibration for life. Optical fiber outputting laser is used in the spectrum analyzer 23, and the analyzer is configured as a multi-channel analyzer system, which can realize multi-point simultaneous detection and real-time monitoring and the response time within 1 min.

In this embodiment, the spectrum leakage monitoring loop 20 is arranged around each weld seam of the main steam pipeline in the insulation layer. It detects the steam leakage through the micro-optical fiber probe 21, and then emits laser with a specific wavelength through the laser transmitter 22 for laser scanning, and transmits the scanning result to the spectrum analyzer 23 for spectrum signal analysis and processing, and the processed signal data is transmitted to the network switch 30, which transmits the received signal data to the control unit 40. The control unit 40 processes, analyzes and records the signal data, and the display unit 50 displays the processed data, thus realizing the detection of the leakage position and amount of the main steam pipeline.

In the acousto-optic leakage monitoring system for the main steam pipeline in nuclear power plant in the above embodiment, the acoustic emission leakage monitoring loop 10 and the spectrum leakage monitoring loop 20 are arranged on the main steam pipeline, the signal data of each loop is received through the network switch 30, and analyzed and processed through the control unit 40. The network switch 30 can receive the signals of the acoustic emission leakage monitoring loop 10 and the spectrum leakage monitoring loop 20 respectively, and the control unit 40 analyzes and processes the signal data. It can also receive the signals of the acoustic emission leakage monitoring loop 10 and the spectrum leakage monitoring loop 20 at the same time, and the control unit 40 can integrate and analyze the received signal data, so as to realize redundant setting and diversified leakage monitoring of the main steam pipeline, and find out the leakage point and determine the leakage amount more quickly and accurately after the pipeline leaks.

Figure 2:
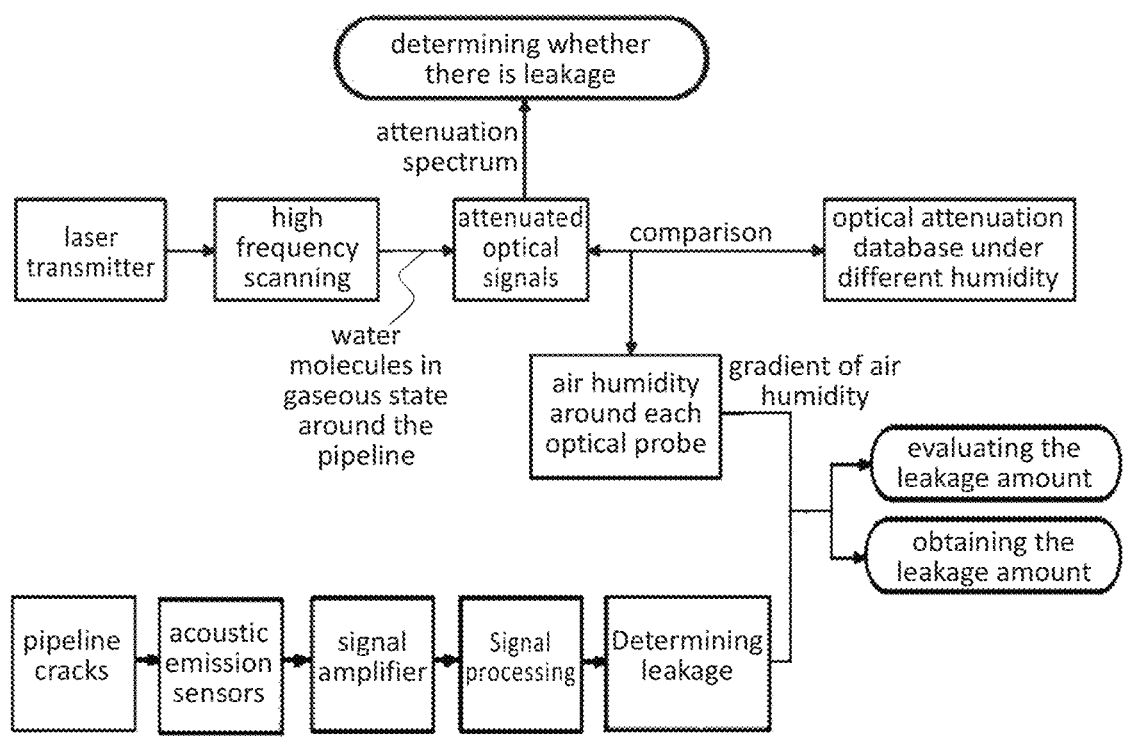
FIG. 2 is a flow diagram of the acousto-optic leakage monitoring system for the main steam pipeline in nuclear power plant according to an embodiment of the present invention.

FIG. 2 is a flow diagram of the acousto-optic leakage monitoring system for the main steam pipeline in nuclear power plant according to an embodiment of the present invention.

As shown in FIG. 2, the specific process for using the acousto-optic leakage monitoring system for the main steam pipeline in nuclear power plant according to the present invention is as follows:

Step 1: arranging a plurality of detection points on the main steam pipeline;

The main steam pipeline 1 of nuclear power plant is formed by welding multiple pipelines, which has the characteristics of high thermal parameters, many weld seams and bearing complex stress, and has high requirements on safety. The main steam pipeline 1 is provided with a plurality of detection points 2. Because stress concentration is likely to occur at the weld seams of the pipeline which have high requirements on welding quality and reinforcement of joint pipes, pipeline leakage usually occurs at the weld seams of pipeline. Therefore the detection points 2 are preferably arranged around each weld seam of the main steam pipeline 1.

Step 2, carrying out acoustic emission leakage monitoring and spectrum leakage monitoring on a plurality of detection points, respectively.

Acoustic emission leakage monitoring comprises the following steps of: detecting ultrasonic signals at a plurality of detection points respectively; amplifying the detected signals and collecting data. The acoustic emission leakage monitoring loop detects pipeline cracks, wherein the acoustic emission sensor can monitor stress changes of pipeline at the initial stage when pipeline structure changes, the ultrasonic signals reflected by the pipeline is collected, amplified and processed so as to realize stress monitoring, thus determining the leakage amount.

Spectrum leakage monitoring includes: detecting steam at a plurality of detection points; laser scanning water molecules in gaseous state around the pipeline by using the high frequency scanning optical signal emitted by a laser transmitter; receiving and processing spectrum signals obtained by laser scanning; comparing attenuated optical signals, determining whether there is leakage through attenuation spectrum, and determining leakage amount according to air humidity around each optical probe obtained by comparing the attenuated optical signals with optical attenuation database under different humidity.

step 3, receiving the output signals of the acoustic emission leakage monitoring and the output signals of the spectrum leakage monitoring.

Step 4, processing the received output signals, determining whether a plurality of detection points on the main steam pipeline have leakage and/or a risk of leakage; if yes, evaluating the leakage amount, finding out the leakage position, and sending out a leakage alarm.

Upon receiving the alarm, the operator can take immediate action to accurately find out the location of the detection point 2 with abnormal data, and carry out troubleshooting and maintenance.

The acousto-optic leakage monitoring system for the main steam pipeline in nuclear power plant according to the present invention realizes the diversity and redundancy of the main steam pipeline leakage monitoring methods by combining acoustic emission and spectroscopy, so that the detection results are more credible, the leakage of steam in gaseous state can be directly monitored at multiple measuring points under the containment environment, and the maintenance cost after installation is low. The detection sensitivity is higher and the response time is shortened, which significantly improves the response speed after leakage is found and provides a larger safety margin. The structural damage of the main steam pipeline is detected during the stage of the pipeline cracks propagation, and an early warning can be given before the leakage of the main steam pipeline.

The above shows and describes the basic principles and main features of the present invention and the advantages of the present invention. It should be understood by those skilled in the art that the present invention is not limited by the above embodiments. The above embodiments and descriptions only illustrate the principles of the present invention. Without departing from the spirit and scope of the present invention, there will be various changes and modifications in the present invention, all of which fall within the scope of the claimed invention.

The invention claimed is:

1. An acousto-optic leakage monitoring system for a main steam pipeline in a nuclear power plant, the acousto-optic leakage monitoring system comprising:
    an acoustic emission leakage monitoring loop comprising a plurality of acoustic emission sensors arranged around weld seams of the main steam pipeline and a spectrum leakage monitoring loop comprising a plurality of micro-optical fiber probes arranged around the weld seams of the main steam pipeline;
    wherein the acoustic emission sensors and the micro-optical fiber probes are in communication connection with each other through a network switch and the network switch is sequentially connected with a control unit and a display unit.

2. The acousto-optic leakage monitoring system according to claim 1, wherein
    the acoustic emission leakage monitoring loop further comprises signal amplifiers and a data acquisition unit connected between the acoustic emission sensors and the network switch, and
    the acoustic emission sensors are in communication connection with the data acquisition unit through the signal amplifiers.

3. The acousto-optic leakage monitoring according to claim 2, wherein the acoustic emission sensors, the signal amplifiers and the data acquisition unit are in communication connection with each other through armored optical fiber cables.

4. The acousto-optic leakage monitoring system according to claim 2, wherein the data acquisition unit comprises an acquisition card and an I/O card, wherein the acquisition card collects signals transmitted by the signal amplifiers and converts the signals into digital signals, and the I/O card transmits the digital signals to the network switch.

5. The acousto-optic leakage monitoring system according to claim 1, wherein
    the spectrum leakage monitoring loop further comprises a laser transmitter and a spectrum analyzer connected between the micro-fiber optical probes and the network switch; and
    the micro-optical fiber probes are in communication connection with the spectrum analyzer through the laser transmitter.

6. The acousto-optic leakage monitoring system according to claim 5, wherein the micro-optical fiber probes, the laser transmitter and the spectrum analyzer are in communication connection with each other through armored optical fiber cables.

7. The acousto-optic leakage monitoring system according to claim 6, wherein the micro-optical fiber probes are arranged in a containment of the nuclear power plant.

* * * * *